(12) United States Patent
Huang

(10) Patent No.: US 11,803,112 B2
(45) Date of Patent: Oct. 31, 2023

(54) PROJECTION DEVICE AND DISPLAY METHOD THEREOF

(71) Applicant: Coretronic Corporation, Hsin-Chu (TW)

(72) Inventor: Chin-Wen Huang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/204,948

(22) Filed: Mar. 18, 2021

(65) Prior Publication Data

US 2021/0294193 A1 Sep. 23, 2021

(30) Foreign Application Priority Data

Mar. 19, 2020 (CN) .................... CN202010194644.4

(51) Int. Cl.
*G03B 21/20* (2006.01)
*G02B 26/00* (2006.01)
*H04N 9/31* (2006.01)

(52) U.S. Cl.
CPC ....... *G03B 21/2013* (2013.01); *G02B 26/008* (2013.01); *G03B 21/2033* (2013.01);
(Continued)

(58) Field of Classification Search
CPC ............ G03B 21/2013; G03B 21/2033; H04N 9/3155; H04N 9/3158; H04N 9/3161
(Continued)

(56) References Cited

U.S. PATENT DOCUMENTS

2004/0036668 A1* 2/2004 Nakanishi ............ H04N 9/3182
348/E9.027
2005/0280850 A1* 12/2005 Kim ..................... H04N 9/3111
358/1.9
(Continued)

FOREIGN PATENT DOCUMENTS

CN 1722773 1/2006
CN 101945292 1/2011
(Continued)

OTHER PUBLICATIONS

"Search Report of Europe Counterpart Application", dated Jul. 29, 2021, p. 1-p. 13.
(Continued)

*Primary Examiner* — Jerry L Brooks
(74) *Attorney, Agent, or Firm* — JCIPRNET

(57) ABSTRACT

A projection device and its display method are provided. The projection device includes a light source module, a control device, a light valve module, and a lens module. The light source module provides an illumination beam and includes first and second light sources respectively emitting first and second sub-color beams and a driving circuit driving the first and second light sources. The illumination beam includes the first and second sub-color beams. The light valve module converts the illumination beam to an image beam. The lens module projects the image beam. The projection device is configured to have multiple color gamut modes. In at least partial time of a first time slot, the control device controls the driving circuit to simultaneously drive the first and second light sources.

12 Claims, 4 Drawing Sheets

(52) U.S. Cl.
CPC ......... *H04N 9/3155* (2013.01); *H04N 9/3158* (2013.01); *H04N 9/3161* (2013.01); *H04N 9/3164* (2013.01); *H04N 9/3197* (2013.01)

(58) Field of Classification Search
USPC .......................................................... 353/31
See application file for complete search history.

(56) References Cited

U.S. PATENT DOCUMENTS

2009/0289967 A1* 11/2009 Clatanoff ............... G09G 3/346
    345/691
2010/0091050 A1    4/2010 El-Ghoroury et al.

FOREIGN PATENT DOCUMENTS

| CN | 104166300  | 11/2014 |
|----|------------|---------|
| CN | 102548091  | 12/2014 |
| CN | 104991406  | 10/2015 |
| CN | 105911807  | 8/2016  |
| CN | 110068982  | 7/2019  |
| TW | 201344336  | 11/2013 |
| WO | 2019134266 | 7/2019  |
| WO | 2019144494 | 8/2019  |

OTHER PUBLICATIONS

"Office Action of China Counterpart Application", dated Mar. 15, 2022, p. 1-p. 8.

* cited by examiner

PROJECTION DEVICE AND DISPLAY METHOD THEREOF

CROSS-REFERENCE TO RELATED APPLICATION

This application claims the priority benefit of China patent application serial no. 202010194644.4, filed on Mar. 19, 2020. The entirety of the above-mentioned patent application is hereby incorporated by reference herein and made a part of this specification.

BACKGROUND OF THE INVENTION

Field of the Invention

The invention relates to a projection display technology, and in particular to a projection device and a multiple color gamut mode display method thereof.

Description of Related Art

In order to improve a projection brightness of a projection device and avoid issues of low wavelength conversion efficiency and difficulty of dissipating a large amount of heat energy generated during the wavelength conversion process, more and more projection devices began to directly adopt laser light beams as illumination beams. However, the wavelengths of light beams emitted by laser light sources usually have fixed values. As long as the laser light source is determined, the display color gamut of the projection device is determined, so that it is rather difficult to satisfy requirements of different color gamuts.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY OF THE INVENTION

The invention provides a projection device and a display method thereof, whereby the projection device is allowed to have multiple color gamut modes to satisfy requirements of color gamuts of different display images.

Other objects and advantages of the invention can be further understood from the technical features disclosed in the invention.

In order to achieve one or a portion of or all of the objectives or other objectives, an embodiment of the invention provides a projection device. The projection device includes a light source module, a control device, and a lens module. The light source module is configured to provide an illumination beam and includes a first light source for emitting a first sub-color beam, a second light source for emitting a second sub-color beam, and a driving circuit for driving the first light source and the second light source. The illumination beam includes the first sub-color beam and the second sub-color beam. The control device is electrically connected to the driving circuit. The light valve module is disposed on a transmission path of the illumination beam and configured to convert the illumination beam into an image beam. The lens module is disposed on a transmission path of the image beam and configured to project the image beam. The control device controls the driving circuit to simultaneously drive the first light source and the second light source in at least partial time of a first time slot.

To achieve one, part, or all of the foregoing purposes or other purposes, an embodiment of the invention provides a display method of a projection device. The display method includes following steps. In a first time slot, a driving circuit is controlled to drive a first light source to emit a first sub-color beam; in at least partial time of the first time slot, the driving circuit is controlled to drive a second light source to emit a second sub-color beam.

Based on the above, the embodiments of the invention have at least one of the following advantages. An embodiment of the invention provides a projection device and a display method of a projection device. The projection device has multiple color gamut modes. At least two light sources are selectively driven by a control device at the same time, and a brightness ratio between sub-color beams of different wavelengths is adjusted to change color beams output by an illumination module, whereby the projection device may have different color gamuts.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
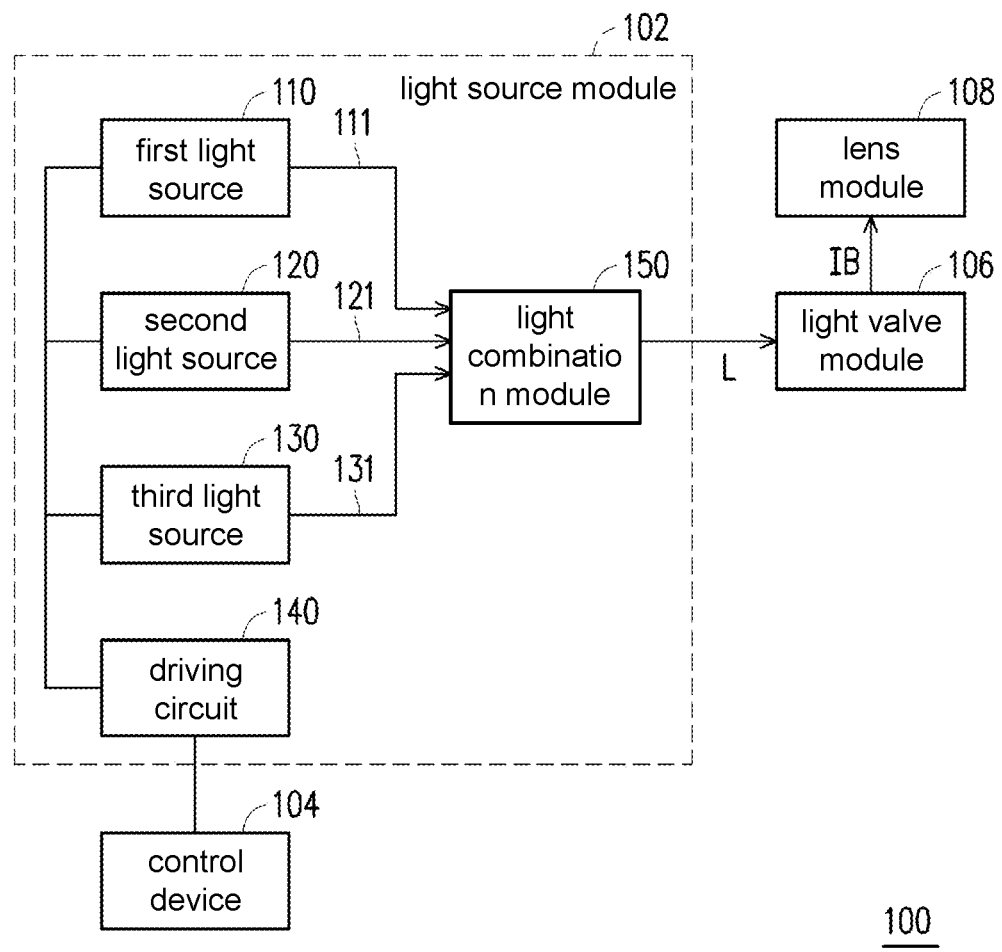
FIG. 1 is a block diagram of a projection device according to an embodiment of the invention.

FIG. 1 is a block diagram of a projection device according to an embodiment of the invention. With reference to FIG. 1, the projection device 100 includes a light source module 102, a control device 104, a light valve module 106, and a lens module 108. The light source module 102 is configured to provide an illumination beam L. The light source module 102 at least includes a plurality of light sources configured to provide different color beams and a driving circuit 140 configured to drive the light sources. The control device 104 is electrically connected to the driving circuit 140 to control a driving signal output by the driving circuit 140, e.g., a driving current or a driving voltage. The light valve module 160 is disposed on a transmission path of the illumination beam L and configured to convert the illumination beam L into an image beam IB. The lens module 108 is disposed on a transmission path of the image beam IB and configured to project the image beam IB to a projection target, e.g., a screen or a wall.

Specifically, the driving circuit 140 may include, for instance, a power voltage supply circuit and a current adjustment circuit. The power voltage supply circuit is configured to provide a voltage and includes but is not limited to a buck power voltage supply circuit, a boost power voltage supply circuit, a buck-boost power voltage supply circuit, and the like. The current adjustment circuit is configured to control a time and a magnitude of the driving current which is being turned on, and the current adjustment circuit is, for instance, a power MOS. The form and the type of the driving circuit 140 are not limited herein.

The control device 104 may be a calculator, a micro controller unit (MCU), a central processing unit (CPU), or any other programmable controller (microprocessor), digital signal processor (DSP), programmable controller, application specific integrated circuits (ASIC), programmable logic device (PLD), or the like. The form and the type of the control device 104 are not limited herein.

The light valve module 106 is, for instance, a digital micro-mirror device (DMD), a liquid crystal on silicon (LCOS) panel, or any other reflective light modulator. In some embodiments, the light valve module 106 may be, for instance, a transmissive liquid crystal display panel, an electro-optic modulator, a magneto-optic modulator, an acousto-optic modulator (AOM), or any other transmissive light modulator. The form and the type of the light valve module 106 are not limited herein.

The lens module 108 includes, for instance, a combination of one or more non-planar optical lenses with diopters, such as a biconcave lens, a biconvex lens, a concave-convex lens, a convex-concave lens, a plano-convex lens, a plano-concave lens, and other combinations of non-planar lenses. In some embodiments, the lens module 108 may also include a planar optical lens which projects the image beam IB from the light valve module 106 to the outside of the projection device 100 in a reflective or transmissive manner. The form and the type of the lens module 108 are not limited herein.

In the embodiment, the projection device 100 has multiple color gamut modes. When the projection device 100 executes one of the color gamut modes, the control device 104 controls the driving circuit 140 to selectively drive the light sources of the light source module 102. By adjusting a brightness ratio between the light sources, different primary color beams are provided to change the display color gamut of the projection device 100.

In the embodiment, the light source module 102 includes at least a first light source 110 and a second light source 120. The first light source 110 is configured to emit a first sub-color beam 111. The second light source 120 is configured to emit a second sub-color beam 121. The illumination beam L includes at least the first sub-color beam 111 and the second sub-color beam 121. When the projection device 100 executes one of the color gamut modes, the control device 104 controls the driving circuit 140 to drive the first light source 110 and the second light source 120 at the same time in at least part of a first time slot, and the first sub-color beam 111 and the second sub-color beam 121 comply with the brightness ratio of the executed color gamut mode. That is, in the first time slot, the first sub-color beam 111 is at least combined with the second sub-color beam 121 to a first color beam. The color gamut mode executed by the projection device 100 is determined by color gamut coordinates of the first color beam.

The implementation details of the projection device 100 are further elaborated below.

In the embodiment, the light source module 102 further includes a third light source 130 and a light combination module 150. The third light source 130 is configured to emit a third sub-color beam 131. The illumination beam L may also include the first sub-color beam 111, the second sub-color beam 121, and the third sub-color beam 131.

Specifically, the first light source 110 is, for instance, a red laser diode (LD). The second light source 120 is, for instance, a green LD. The third light source 130 is, for instance, a blue LD. The light source module 102 may also adopt other solid-state light sources. The number, the range, and the implementation manner of the light sources of the light source module 102 are not limited herein.

The light combination module 150 is configured to combine the first sub-color beam 111, the second sub-color beam 121, and the third sub-color beam 131 to output the illumination beam L of different colors according to the time sequence. The light combination module 150 includes, for instance, a reflector, a prism, an integral rod, or a combination thereof.

Figure 2:
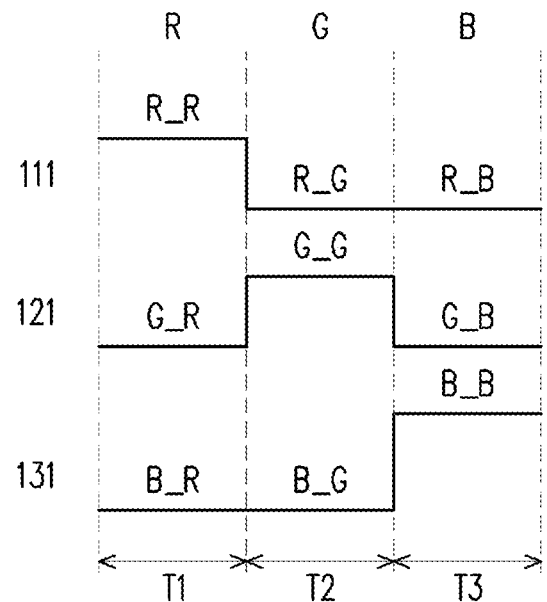
FIG. 2 is a schematic diagram of a time sequence of a brightness of each sub-color beam of a projection device according to an embodiment of the invention.

FIG. 2 is a schematic diagram of a time sequence of a brightness of each sub-color beam of a projection device according to an embodiment of the invention. With reference to FIG. 2 and FIG. 1, the first sub-color beam 111 is a red color beam with a dominant wavelength in a range of 635 nanometers (nm) to 647 nm, the second sub-color beam 121 is a green color beam with a dominant wavelength in a range of 522 nm to 528 nm, and the third sub-color beam 131 is a blue color beam with a dominant wavelength in a range of 462 nm to 468 nm. Due to the red/green/blue light beam emitted by laser diode may have two wave crests. Therefore, the red red/green/blue light beam has the dominant wavelength within a range of wavelength.

In the first time slot (time period) T1, the illumination beam L output by the light source module 102 is the first color beam R, and a brightness of the first sub-color beam 111, a brightness of the second sub-color beam 121, and a brightness of the third sub-color beam 131 are R_R, G_R, and B_R. In a second time slot T2, the illumination beam L output by the light source module 102 is the second color beam G, and the brightness of the first sub-color beam 111, the brightness of the second sub-color beam 121, and the brightness of the third sub-color beam 131 are R_G, G_G, and B_G. In a third time slot T3, the illumination beam L output by the light source module 102 is the third color beam B, and the brightness of the first sub-color beam 111, the brightness of the second sub-color beam 121, and the brightness of the third sub-color beam 131 are R_B, G_B, and B_B. The first color beam R, the second color beam G, and the third color beam B, as the three primary color beams for displaying the color gamut, are respectively the red color beam, the green color beam, and the blue color beam, for instance. In other words, the color gamut range of the display image is determined according to color gamut coordinates of the first color beam R, the second color beam G, and the third color beam B. Note that the color gamut coordinates of the first color beam R, the second color beam G, and the third color beam B may be the same as or different from the first sub-color beam 111, the second sub-color beam 121, and the third sub-color beam 131.

In a first color gamut mode, the light source module 102 outputs the first sub-color beam 111 as the first color beam R in the first time slot T1, outputs the second sub-color beam 121 as the second color beam Gin the second time slot T2, and outputs the third sub-color beam 131 as the third color beam B in the third time slot T3. In other words, in the first time slot T1, the brightness ratio of the first sub-color beam 111, the second sub-color beam 121, and the third sub-color beam 131 is R_R:G_R:B_R=1:0:0; in the second time slot T2, the brightness ratio of the first sub-color beam 111, the second sub-color beam 121, and the third sub-color beam 131 is R_G:G_G:B_G=0:1:0; in the third time slot T3, the brightness ratio of the first sub-color beam 111, the second sub-color beam 121, and the third sub-color beam 131 is R_B:G_B:B_B=0:0:1. Therefore, the first sub-color beam 111, the second sub-color beam 121, and the third sub-color beam 131 as the three primary color beams determine the color gamut range of the first color gamut mode.

In a second color gamut mode, the color gamut range of the projection device 100, for instance, satisfies the DCI-P3 standard. In the first time slot T1, the control device 104 controls the driving circuit 140 to provide the first driving current to the first light source 110 and provide the second driving current to the second light source 120, but the third light source 130 may be selectively driven or not driven. In this example, the third light source 130 is not driven. The first driving current and the second driving current enable the first light source 110 and the second light source 120 to continuously emit the first sub-color beam 111 and the second sub-color beam 121 in the first time slot T1, and a brightness of the first sub-color beam 111 is greater than a brightness of the second sub-color beam 121. The first color beam R output by the light source module 102 includes the first sub-color beam 111 and the second sub-color beam 121 but does not include the third sub-color beam 131. In the first time slot T1, the brightness ratio of the three sub-color beams (111, 121, 131) complies with R_R:G_R:B_R=1:(0.22±0.05):(0~0.05).

In the second time slot T2 of the second color gamut mode, the control device 104 controls the driving circuit 140 to provide the first driving current to the first light source 110 and the second driving current to the second light source 120. The control device 104 selects not to drive the third light source 130. The control device 104 enables the first light source 110 and the second light source 120 to continuously emit the first sub-color beam 111 and the second sub-color beam 121 as the second color beam G in the second time slot T2, and the brightness of the first sub-color beam 111 is greater than the brightness of the second sub-color beam 121. In the second time slot T2, the brightness ratio of the three sub-color beams (111, 121, 131) complies with R_G:G_G:B_G=(0.11±0.05):1:(0~0.05).

In the third time slot T3 of the second color gamut mode, the control device 104 controls the driving circuit 140 to provide the first driving current to the first light source 110, the second driving current to the second light source 120, and the third driving current to the third light source 130. The first light source 110, the second light source 120, and the third light source 130 continuously emit the first sub-color beam 111, the second sub-color beam 121, and the third sub-color beam 131 in third time slot T3, and the brightness of the third sub-color beam 131 is greater than the brightness of the first sub-color beam 111 and greater than the brightness of the second sub-color beam 121. The third color beam B includes the first sub-color beam 111, the second sub-color beam 121, and the third sub-color beam 131. In the third time slot T3, the brightness ratio of the three sub-color beams (111, 121, 131) complies with R_B:G_B:B_B=(0~0.2):(0~0.49):1.

In a third color gamut mode, the projection device 100 switches the color gamut range to satisfy the Rec. 709 standard. In the first time slot T1, the control device 104 controls the driving circuit 140 to drive the first light source 110, the second light source 120, and the third light source 130 to continuously emit the first sub-color beam 111, the second sub-color beam 121, and the third sub-color beam 131. The brightness ratio of the three sub-color beams (111, 121, 131) complies with R_R:G_R:B_R=1:(0.35±0.05):(0~0.05). In the second time slot T2, the brightness ratio of the three sub-color beams (111, 121, 131) complies with R_G:G_G:B_G=(0.11~0.21):1:(0~0.05). In the third time slot T3, the brightness ratio of the three sub-color beams (111, 121, 131) complies with R_B:G_B:B_B=(0~0.2):(0~0.49):1. The amount of the first driving current, the amount of the second driving current, and the amount of the third driving current are determined according to the brightness ratio corresponding to the first light source 110, the second light source 120, and the third light source 130 and the characteristics of the first light source 110, the second light source 120, and the third light source 130.

In particular, the brightness ratio in each time slot (T1, T2, or T3) is determined according to a dominant wavelength of the sub-color beams (111, 121, 131). For instance, in the first time slot T1 and the second time slot T2, the brightness ratio of the first sub-color beam 111 and the second sub-color beam 121 is determined according to the dominant wavelengths of the first sub-color beam 111 and the second sub-color beam 121, and in the third time slot T3, the brightness ratio is determined according to the dominant wavelengths of the first sub-color beam 111, the second sub-color beam 121, and the third sub-color beam 131.

In another embodiment, the dominant wavelength of the first sub-color beam 111 is in a range of 638 nm to 642 nm, the dominant wavelength of the second sub-color beam 121 may be 525 nm, and the dominant wavelength of the third sub-color beam 131 may be 465 nm. Correspondingly, in the DCI-P3 standard, the brightness ratio of the sub-color beams constituting the first color beam R may fall within the following range: R_R:G_R:B_R=1:0.22:0, so that the color gamut coordinates of the first color beam R are (0.68, 0.32); the brightness ratio of the sub-color beams constituting the second color beam G may fall within the following range: R_G:G_G:B_G=0.11:1:0, so that the color gamut coordinates of the second color beam G are (0.265, 0.69); the brightness ratio of the sub-color beams constituting the third color beam B may fall within the following range: R_B:G_B:B_B=0.15:0.42:1, so that the color gamut coordinates of the third color beam B are (0.15, 0.06). In the Rec. 709 standard, the brightness ratio of the sub-color beams constituting the first color beam R may fall within the following range: R_R:G_R:B_R=1:0.35:0.0037, so that the color gamut coordinates of the first color beam R are (0.64, 0.33); the brightness ratio of the sub-color beams constituting the second color beam G may fall within the following range: R_G:G_G:B_G=0.16:1:0.0054, so that the color gamut coordinates of the second color beam G are (0.3, 0.6); the brightness ratio of the sub-color beams constituting the third color beam B may fall within the following range: R_B:G_B:B_B=0.15:0.42:1, so that the color gamut coordinates of the third color beam B are (0.15, 0.06). As to the third color beam B, the control device 104 may select to drive the first light source 110 and the second light source 120 or not.

In another embodiment, the dominant wavelength of the first sub-color beam 111 is in a range of 635 nm to 645 nm, the dominant wavelength of the second sub-color beam 121 is in a range of 532 nm to 538 nm, and the dominant wavelength of the third sub-color beam 131 is in a range of 462 nm to 468 nm. When the projection device 100 executes the selected color gamut mode, in the first time slot T1, the control device 104 controls the driving circuit 140 to drive the first light source 110, the second light source 120, and the third light source 130, so as to enable the first sub-color beam 111, the second sub-color beam 121, and the third sub-color beam 131 to comply with the brightness ratio of the executed color gamut mode. In the first time slot T1, the first sub-color beam 111, the second sub-color beam 121, and the third sub-color beam 131 constitute the first color beam R; in the second time slot T2, the first sub-color beam 111, the second sub-color beam 121, and the third sub-color beam 131 constitute the second color beam G; in the third time slot T3, the first sub-color beam 111, the second sub-color beam 121, and the third sub-color beam 131 constitute the third color beam B. The color gamut of the color gamut mode is determined according to the color gamut coordinates of the first color beam R, the second color beam G, and the third color beam B.

Table 1 below lists the brightness ratio corresponding to different color gamut modes.

TABLE 1

| First color beam R | Color gamut range | R_R | G_R | B_R |
|---|---|---|---|---|
| | DCI-P3 | 1 | 0.23 ± 0.05 | 0~0.05 |
| | Rec. 709 | 1 | 0.38 ± 0.05 | 0~0.05 |
| Second color beam G | Color gamut range | R_G | G_G | B_G |
| | DCI-P3 | 0.06 ± 0.05 | 1 | 0~0.05 |
| | Rec. 709 | 0.11 ± 0.05 | 1 | 0~0.05 |
| Third color beam B | Color gamut range | R_B | G_B | B_B |
| | DCI-P3/Rec. 709 | 0.14 ± 0.05 | 0.43 ± 0.05 | 1 |

In another embodiment, the dominant wavelength of the first sub-color beam 111 is in a range of 635 nm (nanometer) to 645 nm, the dominant wavelength of the second sub-color beam 121 is in a range of 522 nm to 528 nm, and the dominant wavelength of the third sub-color beam 131 is in a range of 452 nm to 458 nm. Table 2 below lists the brightness ratio corresponding to different color gamut modes. In the embodiment of Table 2, the first sub-color beam 111, the second sub-color beam 121, and the third sub-color beam 131 constitute the third color beam B in the third time slot T3; relatively speaking, the second sub-color beam 121 (the green sub-color beam) whose dominant wavelength is in a range of 522 nm to 528 nm has little influence on the third color beam B (the blue color beam), and the third sub-color beam 131 (the blue sub-color beam) whose dominant wavelength is in a range of 452 nm to 458 nm has great influence on the third color beam B (the blue color beam). Therefore, it is necessary to control the brightness G_B of the second sub-color beam 121 to be greater than the brightness B_B of the third sub-color beam 131, so as to comply with the performance of the third color beam B in the color gamut range under the DCI-P3 standard or the Rec. 709 standard.

TABLE 2

| First color beam R | Color gamut range | R_R | G_R | B_R |
|---|---|---|---|---|
| | DCI-P3 | 1 | 0.22 ± 0.05 | 0~0.05 |
| | Rec. 709 | 1 | 0.36 ± 0.05 | 0~0.05 |
| Second color beam G | Color gamut range | R_G | G_G | B_G |
| | DCI-P3 | 0.11 ± 0.05 | 1 | 0~0.05 |
| | Rec. 709 | 0.16 ± 0.05 | 1 | 0~0.05 |
| Third color beam B | Color gamut range | R_B | G_B | B_B |
| | DCI-P3/Rec. 709 | 0~1 | 1.82 ± 0.05 | 1 |

In another embodiment, the dominant wavelength of the first sub-color beam 111 is in a range of 635 nm to 645 nm, the dominant wavelength of the second sub-color beam 121 is in a range of 532 nm to 538 nm, and the dominant wavelength of the third sub-color beam 131 is in a range of 452 nm to 458 nm. Table 3 below lists the brightness ratio corresponding to different color gamut modes. In the embodiment of Table 3, the first sub-color beam 111, the second sub-color beam 121, and the third sub-color beam 131 constitute the third color beam B in the third time slot T3; relatively speaking, the second sub-color beam 121 (the green sub-color beam) whose dominant wavelength is in a range of 532 nm to 538 nm has little influence on the third color beam B (the blue color beam), and the third wavelength sub-color beam 131 (the blue sub-color beam) whose dominant wavelength is in a range of 452 nm to 458 nm has great influence on the third color beam B (the blue color beam). Therefore, it is necessary to control the brightness G_B of the second sub-color beam 121 to be greater than the brightness B_B of the third sub-color beam 131, so as to comply with the performance of the third color beam B in the color gamut range under the DCI-P3 standard or the Rec. 709 standard.

TABLE 3

| First color beam R | Color gamut range | R_R | G_R | B_R |
|---|---|---|---|---|
| | DCI-P3 | 1 | 0.23 ± 0.05 | 0~0.05 |
| | Rec. 709 | 1 | 0.38 ± 0.05 | 0~0.05 |
| Second color beam G | Color gamut range | R_G | G_G | B_G |
| | DCI-P3 | 0.06 ± 0.05 | 1 | 0~0.05 |
| | Rec. 709 | 0.11 ± 0.05 | 1 | 0~0.05 |
| Third color beam B | Color gamut range | R_B | G_B | B_B |
| | DCI-P3/Rec. 709 | 0~1 | 1.84 ± 0.05 | 1 |

Figure 3:
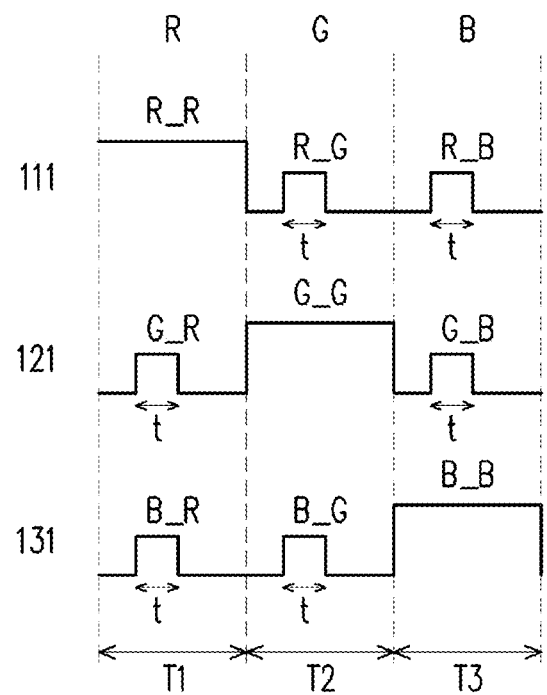
FIG. 3 is a schematic diagram of a time sequence of a brightness of each sub-color beam of a projection device according to another embodiment of the invention.

FIG. 3 is a schematic diagram of a time sequence of a brightness of each sub-color beam of a projection device according to another embodiment of the invention. The embodiment complies with to the brightness ratio of the sub-color beams as provided in the previous embodiments.

In the first time slot T1, the control device 104 controls the driving circuit 140 to provide the first driving current to the first light source 110 and the second driving current to the second light source 120, wherein the first driving current enables the first light source 110 to continuously emit the first sub-color beam 111 in the first time slot T1, and the second driving current enables the second light source 120 to emit the second sub-color bean 121 in partial time t of the first time slot T1, and the brightness of the first sub-color beam 111 is greater than the brightness of the second sub-color beam 121. If it is necessary to drive the third light source 130, the control device 104 controls the driving circuit 140 to provide a third driving current to the third light source 130, and the third light source 130 outputs the third sub-color beam 131 in the partial time t of the first time slot T1. In the embodiment, a pulse width of the second driving current or the third driving current is less than a pulse width of the first driving current. A pulse height of the second driving current or the third driving current may be less than or equal to a pulse height of the first driving current. In addition, a length of the partial time t of the second sub-color beam 121 may not be the same as a length of the partial time t of the third sub-color beam 131, and the start time point may be the same or different.

Similarly, in the second time slot T2, the control device 104 controls the driving circuit 140 to continuously drive the second light source 120, the first light source 110 is allowed to emit the first sub-color beam 111 in partial time t of the second time slot T2, and the third light source 130 is allowed to emit the third sub-color beam 131 in the partial time t of the second time slot T2. In the third time slot T3, the control device 104 controls the driving circuit 140 to continuously drive the third light source 130, the first light source 110 is allowed to emit the first sub-color beam 111 in partial time t of the third time slot T3, and the second light source 120 is allowed to emit the second sub-color beam 121 in the partial time t of the third time slot T3.

In brief, according to the embodiment, the control device 104 in a certain time slot allows one of the light sources to continuously output a sub-color beam and decides to enable the other light sources to output sub-color beams with shorter pulses, so that the brightness ratio of the sub-color beams in the time slot complies with what is described above.

Figure 4:
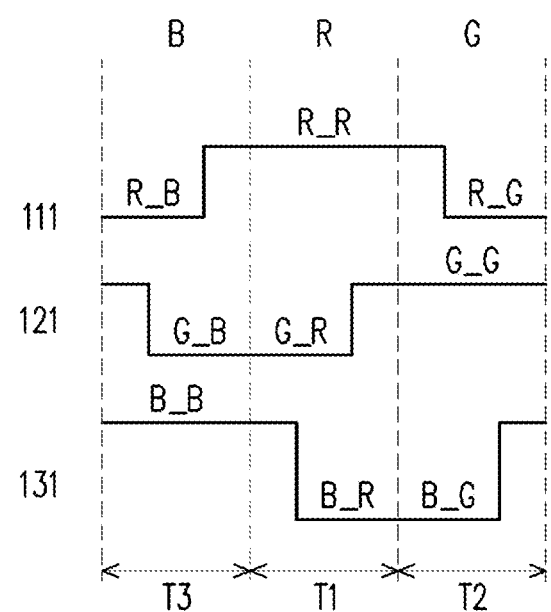
FIG. 4 is a schematic diagram of a time sequence of a brightness of each sub-color beam of a projection device according to another embodiment of the invention.

FIG. 4 is a schematic diagram of a time sequence of a brightness of each sub-color beam of a projection device according to another embodiment of the invention. The embodiment complies with to the brightness ratio of the sub-color beams as provided in the previous embodiments.

In the first time slot T1, the control device 104 controls the driving circuit 140 to drive the first light source 110 to continuously emit the first sub-color beam 111 and turn on the second light source 120 and the third light source 130 in turn, wherein a time period during which the second sub-color beam 121 is being emitted and a time period during which the third sub-color beam 131 is being emitted do not overlap. In the second time slot T2, the control device 104 controls the driving circuit 140 to drive the second light source 120 to continuously emit the second sub-color beam 121 and turn on the first light source 110 and the third light source 130 in turn, wherein a time period during which the first sub-color beam 111 is being emitted and a time period during which the and the third sub-color beam 131 is being emitted do not overlap. In the third time slot T3, the control device 104 controls the driving circuit 140 to drive the third light source 130 to continuously emit the third sub-color beam 131 and turn on the first light source 110 and the second light source 120 in turn, wherein a time period during which the second sub-color beam 121 is being emitted and a time period during which the first sub-color beam 111 is being emitted do not overlap. In short, according to the embodiment, the control device 104 controls the driving circuit 140 to drive at most two light sources at the same time.

In other words, the control device 104 ensures the output time of each sub-color beam crosses over the first time slot T1, the second time slot T2, and the third time slot T3, and in the two adjacent time slots, the time period during which the sub-color beam is being emitted only accounts for a part.

In the embodiment, the amount of the first driving current, the amount of the second driving current, or the amount of the third driving current may be the same or different, and the control device 104 may adjust the pulse width of each driving current to comply with the above-mentioned brightness ratio.

Figure 5:
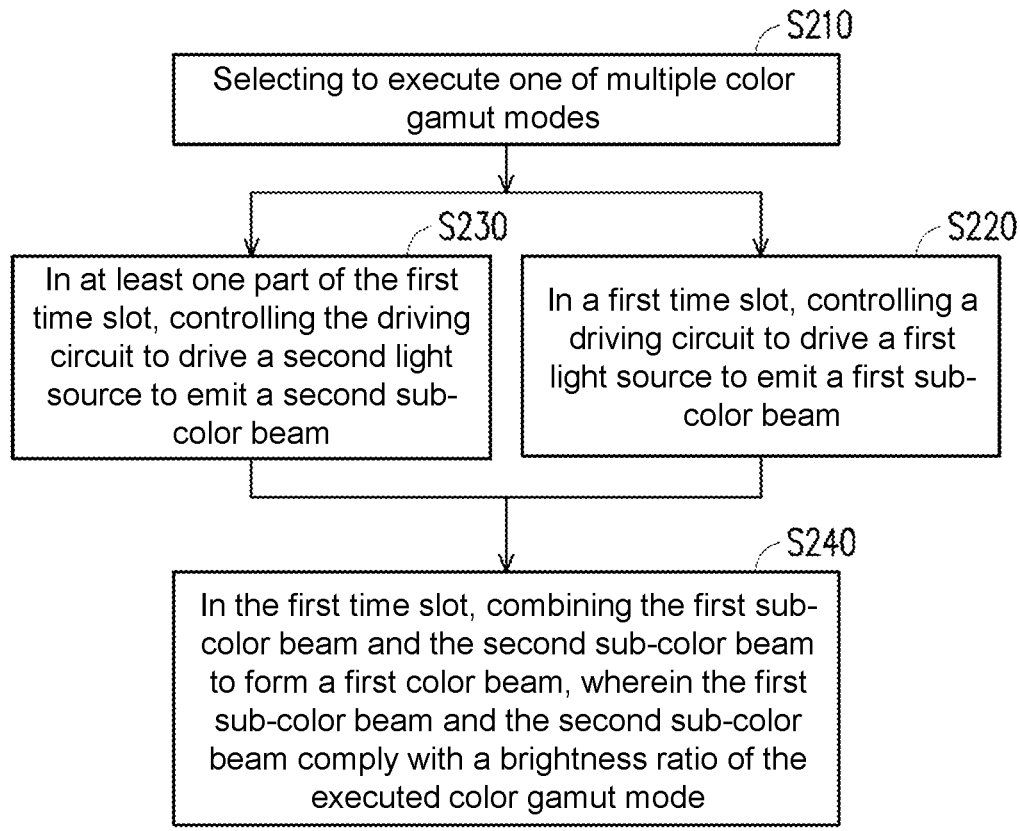
FIG. 5 is a flowchart of a multiple color gamut mode display method of a projection device according to an embodiment of the invention.

FIG. 5 is a flowchart of a multiple color gamut mode display method of a projection device according to an embodiment of the invention. The multiple color gamut mode display method 200 may be adapted to the projection device 100 described above. The steps of the multiple color gamut mode display method 200 are described below with reference to the reference numbers provided in the previous embodiments.

In step S210, one of the multiple color gamut modes of the projection device 100 is selected to be executed. After selecting one of the color gamut modes, the control device 104 obtains the brightness ratio of the color gamut mode. In step S220, in the first time slot T1, the driving circuit 140 is controlled by the control device 104 to drive the first light source 110 to emit the first sub-color beam 111. In step S230, in partial time t of the first time slot T1, the driving circuit 140 is controlled by the control device 104 to drive the second light source 120 to emit the second sub-color beam 121. In step S240, the first sub-color beam 111 and the second sub-color beam 121 are combined to form the first color beam R in the first time slot T1, and the first sub-color beam 111 and the second sub-color beam 121 comply with the brightness ratio of the executed color gamut mode.

The implementation details of the multiple color gamut mode display method 200 may be sufficiently taught, suggested, or described in the embodiments depicted in FIG. 1 to FIG. 4 and thus will not be further explained.

To sum up, the embodiments of the invention have at least one of the following advantages. The projection device and the multiple color gamut mode display method of the invention enable the projection device to switch between multiple color gamut modes. In the primary color beam output time slot of the illumination module, the first light source and the second light source are driven, so that the first sub-color beam emitted by the first light source and the second sub-color beam emitted by the second light source satisfy a brightness ratio, whereby the color gamut coordinates of the color beam output by the illumination module may be changed.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Moreover, these claims may refer to use "first", "second", etc. following with noun or element. Such terms should be understood as a nomenclature and should not be construed as giving the limitation on the number of the elements modified by such nomenclature unless specific number has been given. The abstract of the invention is provided to comply with the rules requiring an abstract, which will allow a searcher to quickly ascertain the subject matter of the technical invention of any patent issued from this invention. It is submitted with the understanding that it will not be configured to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the invention is intended to be dedicated to the public regardless of whether the element or component is explicitly recited in the following claims.

What is claimed is:

1. A projection device, comprising a light source module, a control device, a light valve module, and a lens module, wherein,
the light source module is configured to provide an illumination beam and comprises a first light source, a second light source, a third light source, and a driving circuit, wherein
the first light source is configured to emit a first sub-color beam;
the second light source is configured to emit a second sub-color beam;
the third light source is configured to emit a third sub-color beam, wherein the illumination beam comprises at least one of the first sub-color beam, the second sub-color beam, and the third sub-color beam; and
the driving circuit is configured to drive the first light source, the second light source, and the third light source;
the control device is electrically connected to the driving circuit;
the light valve module is disposed on a transmission path of the illumination beam and configured to convert the illumination beam into an image beam; and
the lens module is disposed on a transmission path of the image beam and configured to project the image beam,
wherein the control device is configured to control the driving circuit to provide a first driving current to the first light source, provide a second driving current to the second light source, and provide a third driving current to the third light source,
wherein the first driving current enables the first light source to continuously emit the first sub-color beam in a first time slot, a first part of a second time slot, and a first part of a third time slot without emitting the first sub-color beam in the other part of the second time slot and in the other part of the third time slot, and wherein the first time slot for emitting the first sub-color beam is adjacent to the first part of the second time slot for emitting the first sub-color beam, and the first time slot for emitting the first sub-color beam is adjacent to the first part of the third time slot for emitting the first sub-color beam,
wherein the second driving current enables the second light source to continuously emit the second sub-color beam in the second time slot, a first part of the first time slot, and a second part of the third time slot without emitting the second sub-color beam in the other part of the first time slot and in the other part of the third time slot, wherein the second time slot for emitting the second sub-color beam is adjacent to the first part of the first time slot for emitting the second sub-color beam,
wherein the third driving current enables the third light source to continuously emit the third sub-color beam in both the third time slot and a second part of the first time slot, wherein the third time slot for emitting the third sub-color beam is adjacent to the second part of the first time slot for emitting the third sub-color beam, and the second part of the first time slot for emitting the third sub-color beam is different from the first part of the first time slot for emitting the second sub-color beam,
wherein the first time slot corresponds to a first color beam, the second time slot corresponds to a second color beam, and the third time slot corresponds to a third color beam; and wherein the first color beam, the second color beam and the third color beam are different color beams.

2. The projection device according to claim 1, wherein the projection device is configured to have multiple color gamut modes, and when the projection device executes one of the multiple color gamut modes, the control device controls the driving circuit to simultaneously drive the first light source and the second light source in at least partial time of the first time slot, and the first sub-color beam and the second sub-color beam comply with a brightness ratio of the executed color gamut mode,
wherein in the first time slot, the first sub-color beam and the second sub-color beam are combined to form the first color beam, and a color gamut of the executed color gamut mode is determined according to color gamut coordinates of the first color beam.

3. The projection device according to claim 2, wherein the brightness ratio of the multiple color gamut modes is determined according to dominant wavelengths of the first sub-color beam and the second sub-color beam.

4. The projection device according to claim 1, wherein a brightness of the first sub-color beam is greater than a brightness of the second sub-color beam.

5. The projection device according to claim 1, wherein when the projection device executes a color gamut mode, in the first time slot, the control device further controls the driving circuit to drive the third light source, so that the first sub-color beam, the second sub-color beam, and the third sub-color beam comply with the brightness ratio of the executed color gamut mode,
wherein the first sub-color beam, the second sub-color beam, and the third sub-color beam are combined to form the first color beam in the first time slot, the first sub-color beam, the second sub-color beam, and the third sub-color beam are combined to form the second color beam in the second time slot, and a color gamut of the executed color gamut mode is determined according to color gamut coordinates of the first color beam and the second color beam.

6. The projection device according to claim 5, wherein in the first time slot, the control device controls the driving circuit to drive the first light source to continuously emit the first sub-color beam and turn on the second light source and the third light source in turn, wherein a time period during which the second sub-color beam is being emitted and a time period during which the third sub-color beam is being emitted do not overlap.

7. A display method of a projection device, comprising:
in a first time slot, controlling a driving circuit to drive a first light source to emit a first sub-color beam;
in partial time of the first time slot, controlling the driving circuit to drive a second light source to emit a second sub-color beam; and
in another partial time of the first time slot, controlling the driving circuit to drive a third light source to emit a third sub-color beam,
wherein the step of controlling the driving circuit to drive the first light source, the step of controlling the driving circuit to drive the second light source, and the step of controlling the driving circuit to drive the third light source comprises:
controlling the driving circuit to provide a first driving current to the first light source, provide a second driving current to the second light source, and provide a third driving current to the third light source,
wherein the first driving current enables the first light source to continuously emit the first sub-color beam in the first time slot, a first part of a second time slot, and a first part of a third time slot without emitting the first sub-color beam in the other part of the second time slot and in the other part of the third time slot, and wherein the first time slot for emitting the first sub-color beam is adjacent to the first part of the second time slot for emitting the first sub-color beam, and the first time slot for emitting the first sub-color beam is adjacent to the first part of the third time slot for emitting the first sub-color beam,
wherein the second driving current enables the second light source to continuously emit the second sub-color beam in the second time slot, a first part of the first time slot, and a second part of the third time slot without emitting the second sub-color beam in the other part of the first time slot and in the other part of the third time slot, wherein the second time slot for emitting the second sub-color beam is adjacent to the first part of the first time slot for emitting the second sub-color beam,
wherein the third driving current enables the third light source to continuously emit the third sub-color beam in both the third time slot and a second part of the first time slot, wherein the third time slot for emitting the third sub-color beam is adjacent to the second part of the first time slot for emitting the third sub-color beam, and the second part of the first time slot for emitting the third sub-color beam is different from the first part of the first time slot for emitting the second sub-color beam,
wherein the first time slot corresponds to a first color beam, the second time slot corresponds to a second color beam, and the third time slot corresponds to a third color beam; and wherein the first color beam, the second color beam and the third color beam are different color beams.

8. The display method according to claim 7, further comprising:
selecting to execute one of multiple color gamut modes, wherein the first sub-color beam and the second sub-color beam comply with a brightness ratio of the executed color gamut mode, and
wherein in the first time slot, the first sub-color beam and the second sub-color beam are combined to form the first color beam, and a color gamut of the executed color gamut mode is determined according to color gamut coordinates of the first color beam.

9. The display method according to claim 8, wherein the brightness ratio of the multiple color gamut modes is determined according to dominant wavelengths of the first sub-color beam and the second sub-color beam.

10. The display method according to claim 7, wherein a brightness of the first sub-color beam is greater than a brightness of the second sub-color beam.

11. The display method according to claim 7, further comprising:
enabling the first sub-color beam, the second sub-color beam, and the third sub-color beam to comply with the brightness ratio of an executed color gamut mode, combining the first sub-color beam, the second sub-color beam, and the third sub-color beam form the first color beam in the first time slot, and combining the first sub-color beam, the second sub-color beam, and the third sub-color beam to form the second color beam in the second time slot, wherein a color gamut of the executed color gamut mode is determined according to color gamut coordinates of the first color beam and the second color beam.

12. The display method according to claim 7, wherein the step of controlling the driving circuit to drive the first light source, the step of controlling the driving circuit to drive the second light source, and the step of controlling the driving circuit to drive the third light source further comprises:
　　in the first time slot, controlling the driving circuit to drive the first light source to continuously emit the first sub-color beam and turn on the second light source and the third light source in turn, wherein a time period during which the second sub-color beam is being emitted and a time period during which the third sub-color beam is being emitted do not overlap.

* * * * *